United States Patent
Ishikura et al.

(10) Patent No.: US 10,491,084 B2
(45) Date of Patent: Nov. 26, 2019

(54) MOTOR DEVICE

(71) Applicant: JTEKT CORPORATION, Osaka-shi, Osaka (JP)

(72) Inventors: Kohei Ishikura, Okazaki (JP); Tsutomu Hibi, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 371 days.

(21) Appl. No.: 15/640,777

(22) Filed: Jul. 3, 2017

(65) Prior Publication Data

US 2018/0013334 A1   Jan. 11, 2018

(30) Foreign Application Priority Data

Jul. 11, 2016 (JP) .................... 2016-137123

(51) Int. Cl.
*H02K 11/00* (2016.01)
*H02K 11/33* (2016.01)
*H02K 11/215* (2016.01)

(52) U.S. Cl.
CPC .......... *H02K 11/33* (2016.01); *H02K 11/215* (2016.01)

(58) Field of Classification Search
CPC ............................. H02K 11/33; H02K 11/215
USPC ...................................................... 310/68 B
See application file for complete search history.

(56) References Cited

U.S. PATENT DOCUMENTS

| | | | | |
|---|---|---|---|---|
| 8,294,457 B2* | 10/2012 | Schrubbe | ................ | G01D 5/06 324/207.2 |
| 8,353,393 B2* | 1/2013 | St.Clair | ................... | B60T 7/042 188/161 |
| 9,080,896 B2* | 7/2015 | Wallrafen | ............. | G01D 3/0365 |
| 9,470,552 B2* | 10/2016 | Ausserlechner | ....... | G01D 5/145 |
| 9,513,344 B2* | 12/2016 | Ausserlechner | ... | G01R 33/0206 |
| 2014/0046625 A1 | 2/2014 | Baecher | | |

FOREIGN PATENT DOCUMENTS

| | | |
|---|---|---|
| EP | 0793075 A1 | 9/1997 |
| EP | 1382935 A1 | 1/2004 |
| EP | 2031354 A2 | 3/2009 |
| JP | 2015-206606 A | 11/2015 |
| WO | 2013/127962 A1 | 9/2013 |

OTHER PUBLICATIONS

Dec. 8, 2017 Search Report issued in European Patent Application No. 17179941.4.

* cited by examiner

*Primary Examiner* — Jianchun Qin
(74) *Attorney, Agent, or Firm* — Oliff PLC (57) ABSTRACT

Provided is a motor device that makes the influence of noise more equal between two signal processing circuits. A rotation angle sensor has a bias magnet, a magnetic sensor unit, a first signal processing circuit, and a second signal processing circuit. The first signal processing circuit is placed symmetrically with the second signal processing circuit in a longitudinal direction of a substrate with respect to the magnetic sensor unit located on a line extended from a central axis of a rotary shaft. An inverter is also placed symmetrically with an inverter in the longitudinal direction of the substrate with respect to the magnetic sensor unit.

6 Claims, 6 Drawing Sheets

MOTOR DEVICE

INCORPORATION BY REFERENCE

The disclosure of Japanese Patent Application No. 2016-137123 filed on Jul. 11, 2016 including the specification, drawings and abstract, is incorporated herein by reference in its entirety.

BACKGROUND OF THE INVENTION

1. Field of the Invention

The present invention relates to motor devices.

2. Description of the Related Art

As described in Japanese Patent Application Publication No. 2015-206606 (JP 2015-206606 A), electric power steering systems using a motor device as a drive source are conventionally known in the art. An example of such a motor device is a motor integrated with a control device that controls a motor.

This control device includes a rotation angle sensor that detects a rotation angle of the motor. This rotation angle sensor includes a magnetic sensor unit and a signal processing circuit. The magnetic sensor unit detects a change in magnetic field which occurs with rotation of a magnet attached to a rotary shaft of the motor. The signal processing circuit calculates the rotation angle based on an output signal of the magnetic sensor unit. The control device controls driving of the motor based on the rotation angle detected by the rotation angle sensor.

In recent years, a circuit configuration has been proposed which include two rotation angle sensors for a single motor for redundancy. This circuit configuration therefore includes two magnetic sensor units and two signal processing circuits for the single motor. However, merely including two rotation angle sensors for redundancy results in a variation between output values (rotation angles) of the two signal processing circuits because the influence of noise varies between the two signal processing circuits.

SUMMARY OF THE INVENTION

It is one object of the present invention to provide a motor device that makes the influence of noise more equal between two signal processing circuits.

According to one aspect of the present invention, a motor device includes: a motor having a rotary shaft; a rotation angle sensor that is disposed on a first end of the rotary shaft and that detects a rotation angle of the rotary shaft; and a control device that is disposed on an end of the motor which is located on a same side as the first end of the rotary shaft and that controls driving of the motor based on the rotation angle detected by the rotation angle sensor. The rotation angle sensor includes a magnet that is disposed on the first end of the rotary shaft, a magnetic sensor unit that is disposed so as to face the magnet and that generates an output signal corresponding to a change in magnetic field which occurs with rotation of the magnet, and at least two signal processing circuits that are arranged symmetrically with respect to a straight line passing through a center of the magnetic sensor unit and that process the output signal.

With this configuration, since the at least two signal processing circuits are arranged symmetrically with respect to the magnetic sensor unit, a magnetic field that is generated from the magnet equally affects the at least two signal processing circuits as noise. The influence of noise can therefore be made equal between the at least two signal processing circuits.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
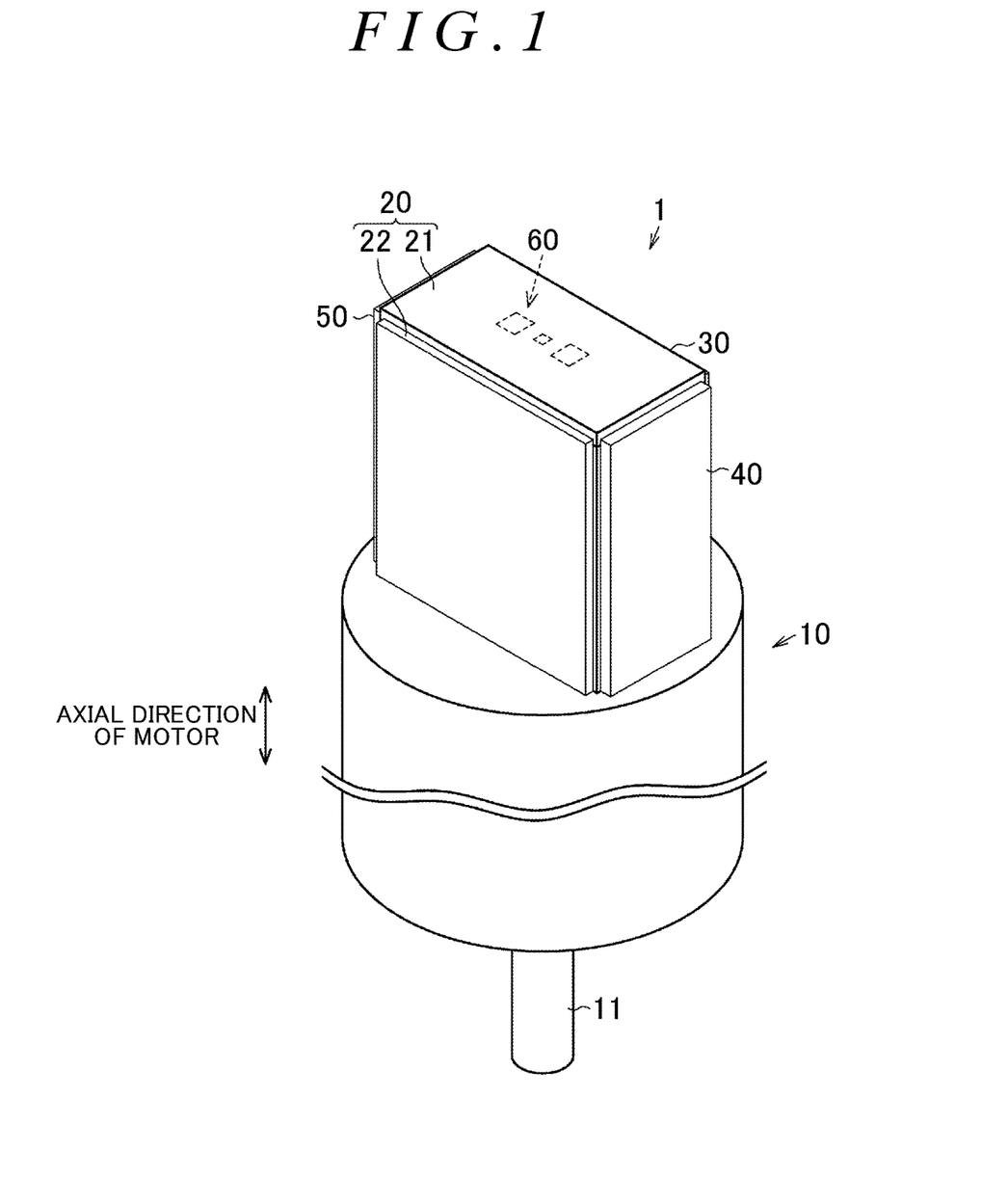
FIG. 1 is a perspective view showing a general configuration of a motor device.

An embodiment of a motor device of the present invention will be described below. For example, the motor device of the present embodiment is used as a drive source for electric power steering systems. As shown in FIG. 1, a motor device 1 has a motor 10, a control device 20, and a heatsink 30. The motor 10 has a rotary shaft 11. A rotation angle sensor 60, which will be described later, is disposed on a first end (upper end in FIG. 1) of the rotary shaft 11. A second end of the rotary shaft 11 is a portion projecting downward in FIG. 1 and mechanically connected to a mechanism that is driven by the motor 10. The control device 20 has substrates 21, 22. The control device 20 controls driving of the motor 10. The heatsink 30 and the substrates 21, 22 are disposed on one (upper end in FIG. 1) of the axial ends of the motor 10 which is located on the same side as the first end of the rotary shaft 11. The heatsink 30 is in the shape of a rectangular parallelepiped. Each of the substrates 21, 22 has a rectangular shape. The substrate 21 is fixed to the opposite end of the heatsink 30 from the motor 10 so as to extend in a direction perpendicular to the axial direction of the motor 10. The substrate 22 is disposed on a side surface of the heatsink 30 so as to extend along an axis of the motor 10 between the substrate 21 and the motor 10.

Inverters 40, 50 are disposed on two side surfaces of the heatsink 30 which are perpendicular to the side surface on which the substrate 22 is disposed. The inverters 40, 50 are located between the substrate 21 and the motor 10 in a direction along the axis of the motor 10. The inverter 40 faces the inverter 50 with the heatsink 30 interposed therebetween. The heatsink 30 serves to facilitate heat dissipation from the inverters 40, 50. The motor device 1 is also provided with choke coils, not shown, near the inverters 40, 50.

Figure 2:
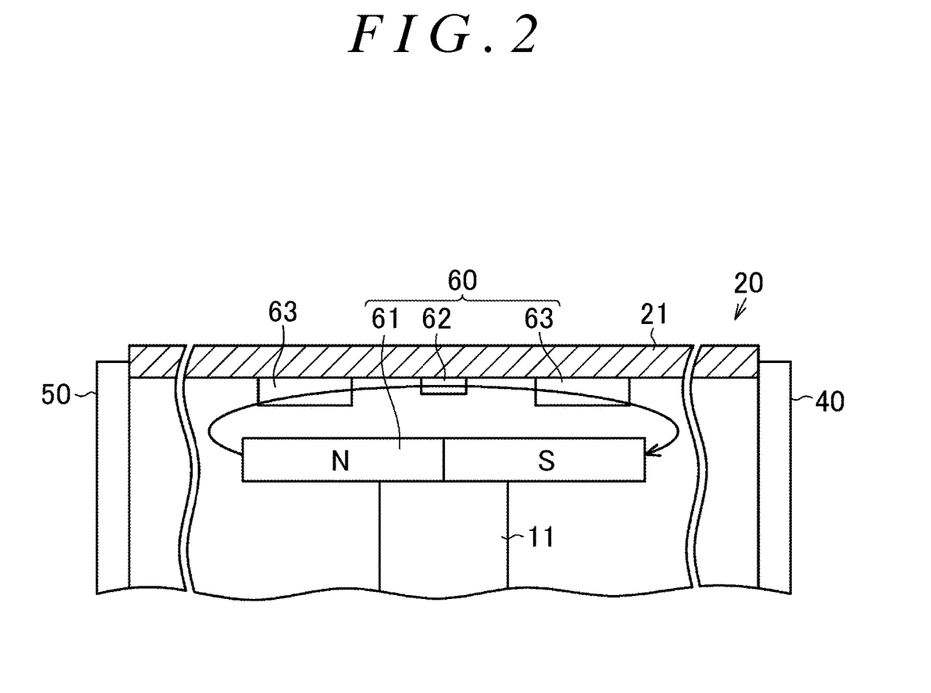
FIG. 2 is a sectional view of a main part of the motor device, showing a structure around a rotation angle sensor.

As shown in FIG. 2, the control device 20 is provided with the rotation angle sensor 60 that detects a rotation angle of the rotary shaft 11. The rotation angle sensor 60 has a columnar bias magnet 61, a magnetic sensor unit 62, and a signal processing circuit 63. For example, magneto-resistive (MR) sensors etc. are used as the magnetic sensor unit 62. The bias magnet 61 is fixed to the first end (upper end in FIG. 2) of the rotary shaft 11. The magnetic sensor unit 62 is disposed on the substrate 21. The magnetic sensor unit 62 faces the bias magnet 61 in a direction along an axis of the rotary shaft 11. For simplicity of illustration, the heatsink 30 etc. is not shown in FIG. 2.

Figure 3:
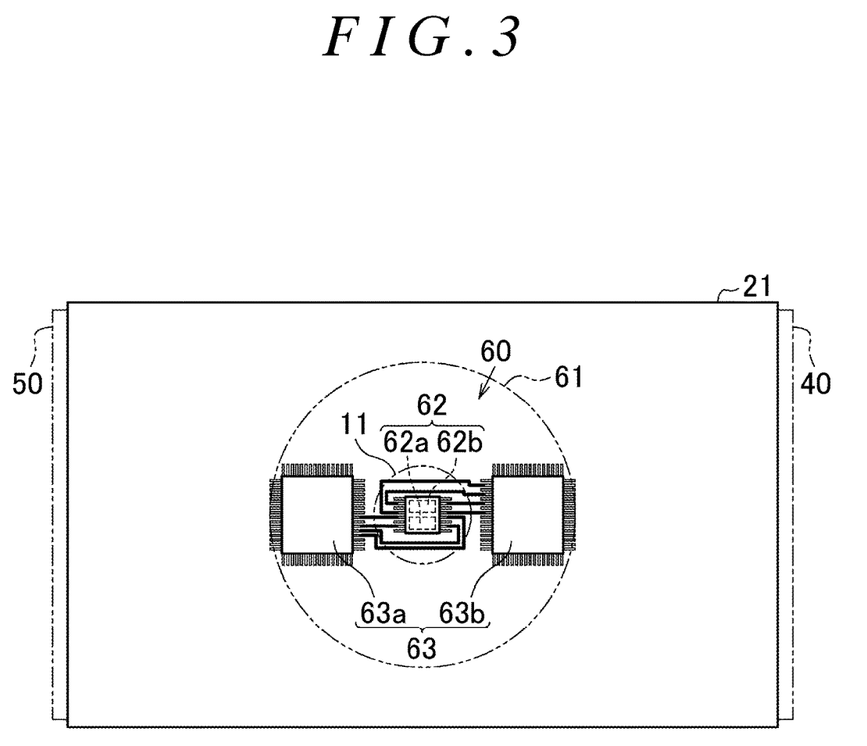
FIG. 3 is a plan view showing a structure around a magnetic sensor unit and a signal processing circuit.

As shown in FIG. 3, the signal processing circuit 63 is also disposed on the substrate 21. The signal processing circuit 63 is located on the same plane as the magnetic sensor unit 62. The signal processing circuit 63 has a first signal processing circuit 63a and a second signal processing circuit 63b. The first signal processing circuit 63a, the second signal processing circuit 63b, and the magnetic sensor unit 62 are arranged in line in a direction perpendicular to the axial direction of the rotary shaft 11. The distance between the first signal processing circuit 63a and the magnetic sensor unit 62 in the direction perpendicular to the axial direction of the rotary shaft 11 is equal or substantially equal to that between the second signal processing circuit 63b and the magnetic sensor unit 62 in the direction perpendicular to the axial direction of the rotary shaft 11. The first signal processing circuit 63a and the second signal processing circuit 63b are arranged in a longitudinal direction of the substrate 21 symmetrically with respect to a straight line passing through the center of the magnetic sensor unit 62. The inverters 40, 50 are also arranged in the longitudinal direction of the substrate 21 symmetrically with respect to the straight line passing through the center of the magnetic sensor unit 62. The distance between the first signal processing circuit 63a and the inverter 50 in the direction perpendicular to the axial direction of the rotary shaft 11 is therefore almost the same as that between the second signal processing circuit 63b and the inverter 40 in the direction perpendicular to the axial direction of the rotary shaft 11. It is preferable that not only the inverters 40, 50 but also various noise sources including the choke coils be arranged symmetrically with respect to, or at the same distance from, the straight line passing through the center of the magnetic sensor unit 62, and that the first signal processing circuit 63a and the second signal processing circuit 63b be arranged symmetrically with respect to, or at the same distance from, the straight line passing through the center of the magnetic sensor unit 62.

As shown in FIG. 3, each of the magnetic sensor unit 62, the first signal processing circuit 63a, and the second signal processing circuit 63b is in the form of a quadrilateral IC chip as viewed in the axial direction of the rotary shaft 11. The magnetic sensor unit 62 has a plurality of terminals extending from each of its four side surfaces. Each of the first signal processing circuit 63a and the second signal processing circuit 63b also has a plurality of terminals extending from each of its four side surfaces. The magnetic sensor unit 62 has a first magnetic sensor unit 62a and a second magnetic sensor unit 62b. Two of the terminals of the first magnetic sensor unit 62a which face the first signal processing circuit 63a are connected to two of the terminals of the first signal processing circuit 63a which face the first magnetic sensor unit 62a. Two of the terminals of the first magnetic sensor unit 62a which face the second signal processing circuit 63b (two of the terminals disposed at the opposite end of the first magnetic sensor unit 62a from the first signal processing circuit 63a) are connected to two of the terminals of the first signal processing circuit 63a which face the first magnetic sensor unit 62a.

Two of the terminals of the second magnetic sensor unit 62b which face the first signal processing circuit 63a are connected to two of the terminals of the second signal processing circuit 63b which face the second magnetic sensor unit 62b. Two of the terminals of the second magnetic sensor unit 62b which face the second signal processing circuit 63b are connected to two of the terminals of the second signal processing circuit 63b which face the second magnetic sensor unit 62b. The first magnetic sensor unit 62a and the second magnetic sensor unit 62b are arranged symmetrically with respect to a central axis of the rotary shaft 11 as viewed in the axial direction of the rotary shaft 11. An axis of symmetry of the first magnetic sensor unit 62a and the second magnetic sensor unit 62b is perpendicular to an axis of symmetry of the first signal processing circuit 63a and the second signal processing circuit 63b.

Electrical signals (output voltages) generated by the first magnetic sensor unit 62a and the second magnetic sensor unit 62b are sent to the first signal processing circuit 63a and the second signal processing circuit 63b through a connection path between the first magnetic sensor unit 62a and the first signal processing circuit 63a and a connection path between the second magnetic sensor unit 62b and the second signal processing circuit 63b.

The first signal processing circuit 63a and the second signal processing circuit 63b detect a rotation angle of the rotary shaft 11 based on the obtained electrical signals. The circuit configuration of the magnetic sensor unit 62 will be described in detail below. The magnetic sensor unit 62 generates electrical signals according to a direction of a bias magnetic field that is applied from the bias magnet 61.

Figure 4:
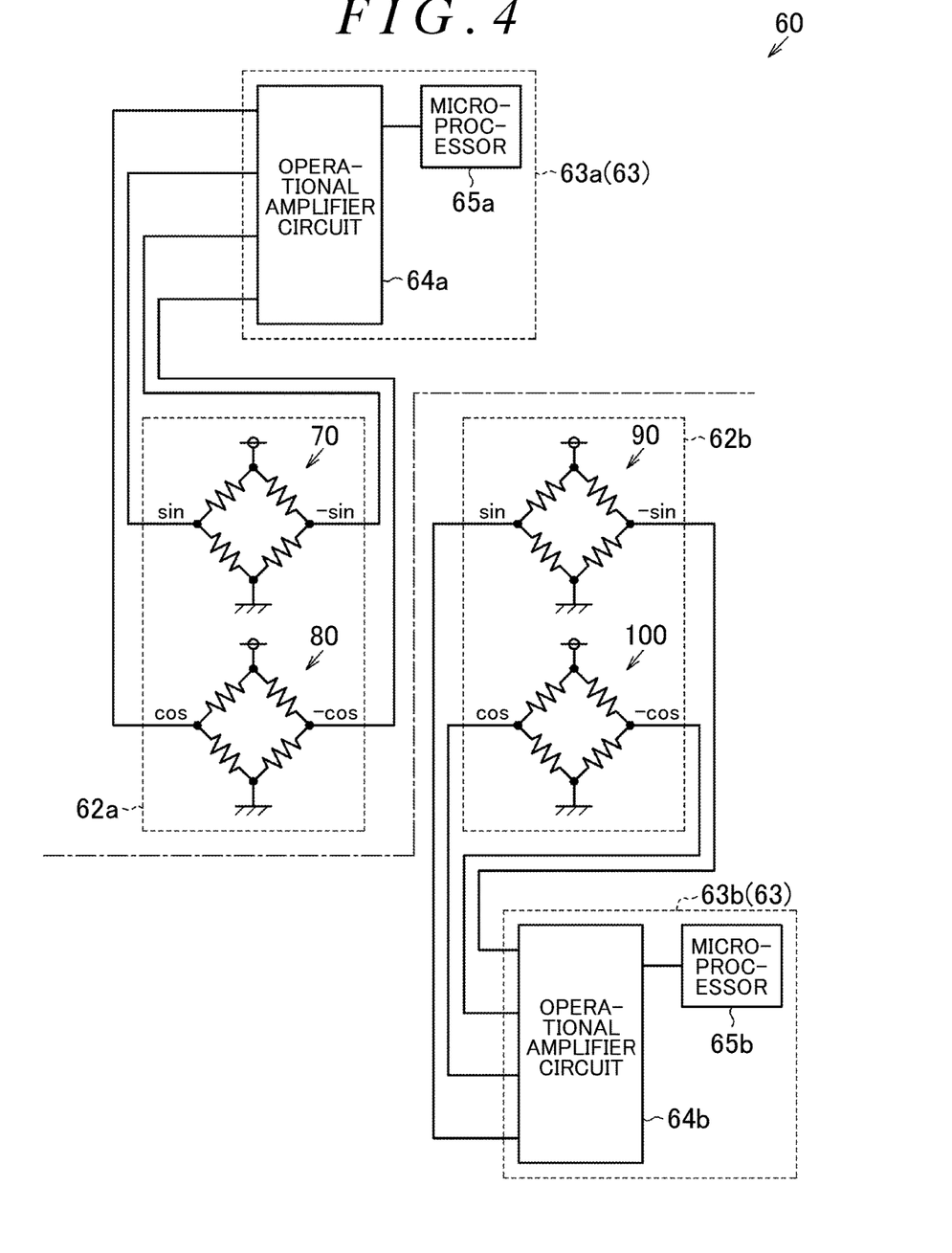
FIG. 4 is a circuit block diagram showing circuit structures of the magnetic sensor unit and the signal processing circuit.

As shown in FIG. 4, the first magnetic sensor unit 62a includes a first bridge circuit 70 and a second bridge circuit 80. The first signal processing circuit 63a is provided with an operational amplifier circuit 64a and a microprocessor 65a.

Each of the first bridge circuit 70 and the second bridge circuit 80 includes four magneto-resistive (MR) elements arranged in the form of a bridge. For example, in the first bridge circuit 70, two of the four MR elements are connected in series to form a first half bridge, and the remaining two MR elements are connected in series to form a second half bridge. These two half bridges are connected in parallel between a power supply (power supply voltage +Vcc) and the ground. The first bridge circuit 70 outputs midpoint potentials of the two half bridges to the operational amplifier circuit 64a as first and second electrical signals. Similarly, the second bridge circuit 80 outputs midpoint potentials of its two half bridges to the operational amplifier circuit 64a as third and fourth electrical signals. When the bias magnet 61 rotates with the rotary shaft 11, a resistance value of each MR element of the first magnetic sensor unit 62a and the second magnetic sensor unit 62b changes accordingly. As the resistance value of each MR element changes, each electrical signal changes accordingly. That is, each electrical signal changes according to the rotation angle of the rotary shaft 11.

The first to fourth electrical signals can be represented by sin or cos. For example, the first electrical signal is a sin signal that changes like a sine wave with respect to the rotation angle of the rotary shaft 11, and the second electrical signal is a −sin signal that is 180 degrees out of phase with respect to the first electrical signal. The third electrical signal is a cos signal that changes like a cosine wave with respect to the rotation angle of the rotary shaft 11, and the fourth electrical signal is a −cos signal that is 180 degrees out of phase with respect to the third electrical signal.

The operational amplifier circuit 64a (first signal processing circuit 63a) obtains the first to fourth electrical signals received from the first magnetic sensor unit 62a at predetermined sampling intervals. The operational amplifier circuit 64a outputs, for example, the difference between the first and second electrical signals and the difference between the third and fourth electrical signals.

The microprocessor 65a obtains the difference between the first and second electrical signals and the difference between the third and fourth electrical signals and calculates an arc tangent value based on these difference values, thereby detecting the rotation angle of the rotary shaft 11.

Like the first signal processing circuit 63a, the second signal processing circuit 63b has an operational amplifier circuit 64b and a microprocessor 65b. A third bridge circuit 90 and a fourth bridge circuit 100 of the second magnetic sensor unit 62b output fifth to eighth electrical signals. The operational amplifier circuit 64b calculates difference values from the fifth to eighth electrical signals, and the microprocessor 65b detects the rotation angle of the rotary shaft 11 based on the difference values.

The control device 20 controls driving of the motor 10 based on the rotation angle calculated by the microprocessor 65a and the rotation angle calculated by the microprocessor 65b (see FIG. 1).

Functions and effects of the present embodiment will be described.

The rotation angle sensor 60 includes the first magnetic sensor unit 62a and the first signal processing circuit 63a and the second magnetic sensor unit 62b and the second signal processing circuit 63b for redundancy. Accordingly, even if an abnormality occurs in the first magnetic sensor unit 62a and the first signal processing circuit 63a or in the second magnetic sensor unit 62b and the second signal processing circuit 63b, the control device 20 can continue to control driving of the motor 10. For example, if an abnormality occurs in the first magnetic sensor unit 62a, the control device 20 continues to control driving of the motor 10 by using the rotation angle detected by the second magnetic sensor unit 62b and the second signal processing circuit 63b.

The first signal processing circuit 63a and the second signal processing circuit 63b are arranged symmetrically with respect to the magnetic sensor unit 62. The inverters 40, 50 are also arranged symmetrically with respect to the magnetic sensor unit 62. This restrains the influence of various kinds of noise including switching noise of the inverters 40, 50 from varying between the first signal processing circuit 63a and the second signal processing circuit 63b. Since the distance between the first signal processing circuit 63a and the inverter 50 is almost the same as that between the second signal processing circuit 63b and the inverter 40, the influence of noise that is applied from the inverter 50 to the first signal processing circuit 63a is almost the same as that of noise that is applied from the inverter 40 to the second signal processing circuit 63b. The influence of noise is thus made equal between the first signal processing circuit 63a and the second signal processing circuit 63b. The rotation angle calculated by the microprocessor 65a of the first signal processing circuit 63a and the rotation angle calculated by the microprocessor 65b of the second signal processing circuit 63b are therefore less likely to be determined to be different from each other due to noise.

Regarding other noise source other than the inverters 40, 50, the influence of noise that is applied from the noise source can be made equal between the first signal processing circuit 63a and the second signal processing circuit 63b by making the distance between the noise source and the first signal processing circuit 63a almost the same as that between the noise source and the second signal processing circuit 63b.

The first signal processing circuit 63a and the second signal processing circuit 63b are arranged symmetrically with respect to the magnetic sensor unit 62. A magnetic field that changes with rotation of the bias magnet 61 is therefore applied almost equally to the first signal processing circuit 63a and the second signal processing circuit 63b. Accordingly, even if this change in magnetic field is applied as noise to the first signal processing circuit 63a and the second signal processing circuit 63b, the influence of the noise due to the bias magnet 61 is equal between the first signal processing circuit 63a and the second signal processing circuit 63b.

The embodiment may be modified as follows. Other embodiments described below may be combined unless technically inconsistent.

In the present embodiment, the signal processing circuit 63 (the first signal processing circuit 63a and the second signal processing circuit 63b) detects the rotation angle of the rotary shaft 11 based on the obtained electrical signals. However, the present invention is not limited to this. For example, the signal processing circuit 63 may calculate a fundamental component of the rotation angle of the rotary shaft 11 based on the obtained electrical signals. In one example, the signal processing circuit 63 includes only the operational amplifier circuit 64a, and the control device provided separately from the signal processing circuit 63 calculates the rotation angle of the rotary shaft 11 based on the output value of the operational amplifier circuit 64a. In this case, the fundamental component of the rotation angle is the output value of the operational amplifier circuit 64a.

Figure 5:
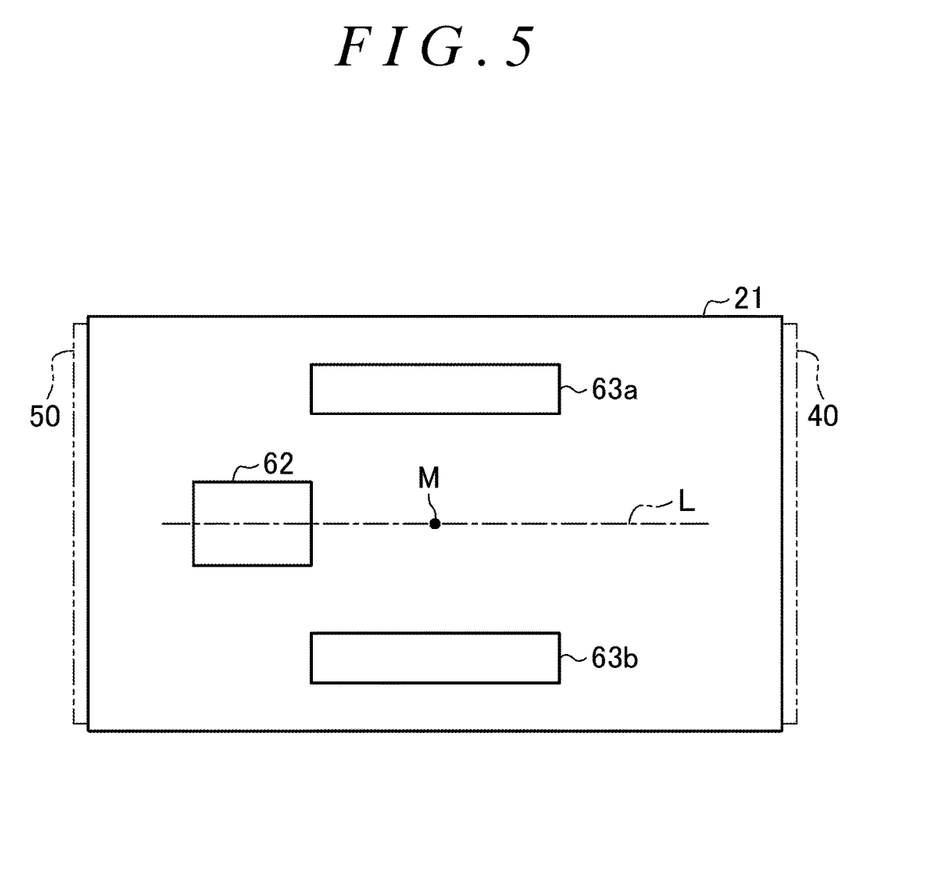
FIG. 5 is a plan view showing a structure around a magnetic sensor unit and a signal processing circuit according another embodiment.

In the present embodiment, the first signal processing circuit 63a and the second signal processing circuit 63b are arranged in the longitudinal direction of the substrate 21 symmetrically with respect to the magnetic sensor unit 62. However, the present invention is not limited to this. For example, the first signal processing circuit 63a and the second signal processing circuit 63b may be arranged in a lateral direction of the substrate 21 symmetrically with respect to the magnetic sensor unit 62. The first signal processing circuit 63a and the second signal processing circuit 63b may be disposed in any manner as long as they are arranged symmetrically with respect to the positions of the noise sources including the inverters 40, 50. For example, as shown in FIG. 5, the first signal processing circuit 63a and the second signal processing circuit 63b may be arranged symmetrically with respect to a straight line L passing through the magnetic sensor unit 62 and a midpoint M between the first signal processing circuit 63a and the second signal processing circuit 63b.

In the present embodiment, the inverters 40, 50 are arranged symmetrically with respect to the magnetic sensor unit 62. However, the present invention is not limited to this. For example, if noise from the inverters 40, 50 hardly affects the signal processing circuit 63 for reasons such as that the signal processing circuit 63 is located substantially away from the inverters 40, 50 that are noise sources, the inverters 40, 50 may be arranged asymmetrically with respect to the magnetic sensor unit 62.

The inverters 40, 50 that are noise sources, the magnetic sensor unit 62, and the signal processing circuit 63 may be mounted on the same substrate. The first signal processing circuit 63a and the second signal processing circuit 63b need only be arranged symmetrically with respect to the magnetic sensor unit 62 to such an extent that the difference between the influence of noise on the first signal processing circuit 63a and the influence of noise on the second signal processing circuit 63b is reduced to some extent (e.g., is smaller than a threshold).

In the present embodiment, the magnetic sensor unit 62 includes the first magnetic sensor unit 62a and the second magnetic sensor unit 62b. However, the present invention is not limited to this. The first signal processing circuit 63a and the second signal processing circuit 63b may be connected to the same magnetic sensor unit.

Figure 6:
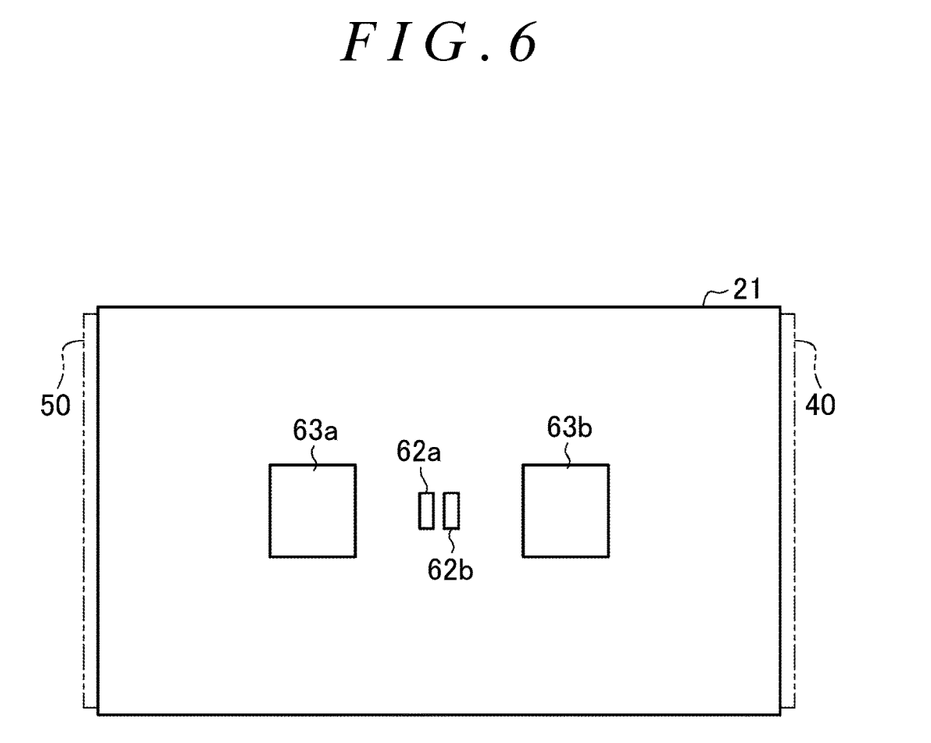
FIG. 6 is a plan view showing a structure around a magnetic sensor unit and a signal processing circuit according still another embodiment.

In the present embodiment, the axis of symmetry of the first magnetic sensor unit 62a and the second magnetic sensor unit 62b is perpendicular to the axis of symmetry of the first signal processing circuit 63a and the second signal processing circuit 63b. However, the present invention is not limited to this. For example, as shown in FIG. 6, the axis of symmetry of the first magnetic sensor unit 62a and the second magnetic sensor unit 62b may be parallel to (or may be the same as) the axis of symmetry of the first signal processing circuit 63a and the second signal processing circuit 63b.

In the present embodiment, the first magnetic sensor unit 62a and the second magnetic sensor unit 62b are arranged symmetrically in the lateral direction of the substrate 21. However, the first magnetic sensor unit 62a and the second magnetic sensor unit 62b may be arranged symmetrically in the longitudinal direction of the substrate 21, or may be arranged asymmetrically.

In the present embodiment, the signal processing circuit 63 has two signal processing circuits, namely the first signal processing circuit 63a and the second signal processing circuit 63b. However, the present invention is not limited to this. The signal processing circuit 63 may have three or more signal processing circuits. In this case, the three or more signal processing circuits are arranged symmetrically with respect to the magnetic sensor unit 62.

For example, MR sensors are used as the magnetic sensor unit 62 in the present embodiment. However, the present invention is not limited to this. For example, other magnetic sensors such as Hall sensors may be used as the magnetic sensor unit 62.

What is claimed is:

1. A motor device, comprising:
a motor having a rotary shaft;
a rotation angle sensor that is disposed on a first end of the rotary shaft and that detects a rotation angle of the rotary shaft; and
a control device that is disposed on an end of the motor which is located on a same side as the first end of the rotary shaft and that controls driving of the motor based on the rotation angle detected by the rotation angle sensor, wherein,
the rotation angle sensor includes
a magnet that is disposed on the first end of the rotary shaft,
a magnetic sensor unit that is disposed so as to face the magnet and that generates an output signal corresponding to a change in magnetic field which occurs with rotation of the magnet, and
at least two signal processing circuits that are arranged symmetrically with respect to a straight line passing through a center of the magnetic sensor unit and that process the output signal.

2. The motor device according to claim 1, wherein,
the magnetic sensor unit and the at least two signal processing circuits are disposed on a same substrate, and
the at least two signal processing circuits are arranged symmetrically with respect to a first axis of symmetry passing through the center of the magnetic sensor unit and perpendicular to an axial direction of the rotary shaft, as viewed in the axial direction of the rotary shaft.

3. The motor device according to claim 2, wherein,
the at least two signal processing circuits are two signal processing circuits,
two of the magnetic sensor units are arranged symmetrically with respect to a third axis of symmetry passing through a center of the rotary shaft and perpendicular to the axial direction of the rotary shaft, as viewed in the axial direction of the rotary shaft, and
the third axis of symmetry is perpendicular to the first axis of symmetry.

4. The motor device according to claim 2, wherein,
the at least two signal processing circuits are two signal processing circuits,
two of the magnetic sensor units are arranged symmetrically with respect to a third axis of symmetry passing through a center of the rotary shaft and perpendicular to the axial direction of the rotary shaft, as viewed in the axial direction of the rotary shaft, and
the third axis of symmetry is the same as, or is parallel to, the first axis of symmetry.

5. The motor device according to claim 1, wherein,
noise sources including at least two drive circuits that supply electric power to the motor are arranged symmetrically with respect to a second axis of symmetry passing through the center of the magnetic sensor unit, as viewed in the axial direction of the rotary shaft.

6. The motor device according to claim 5, wherein,
the second axis of symmetry is the same as, or is parallel to, the first axis of symmetry.

* * * * *